W. S. ELY.
WIND BALANCED DOOR.
APPLICATION FILED JULY 17, 1919.
1,438,477.
Patented Dec. 12, 1922.
4 SHEETS—SHEET 1.
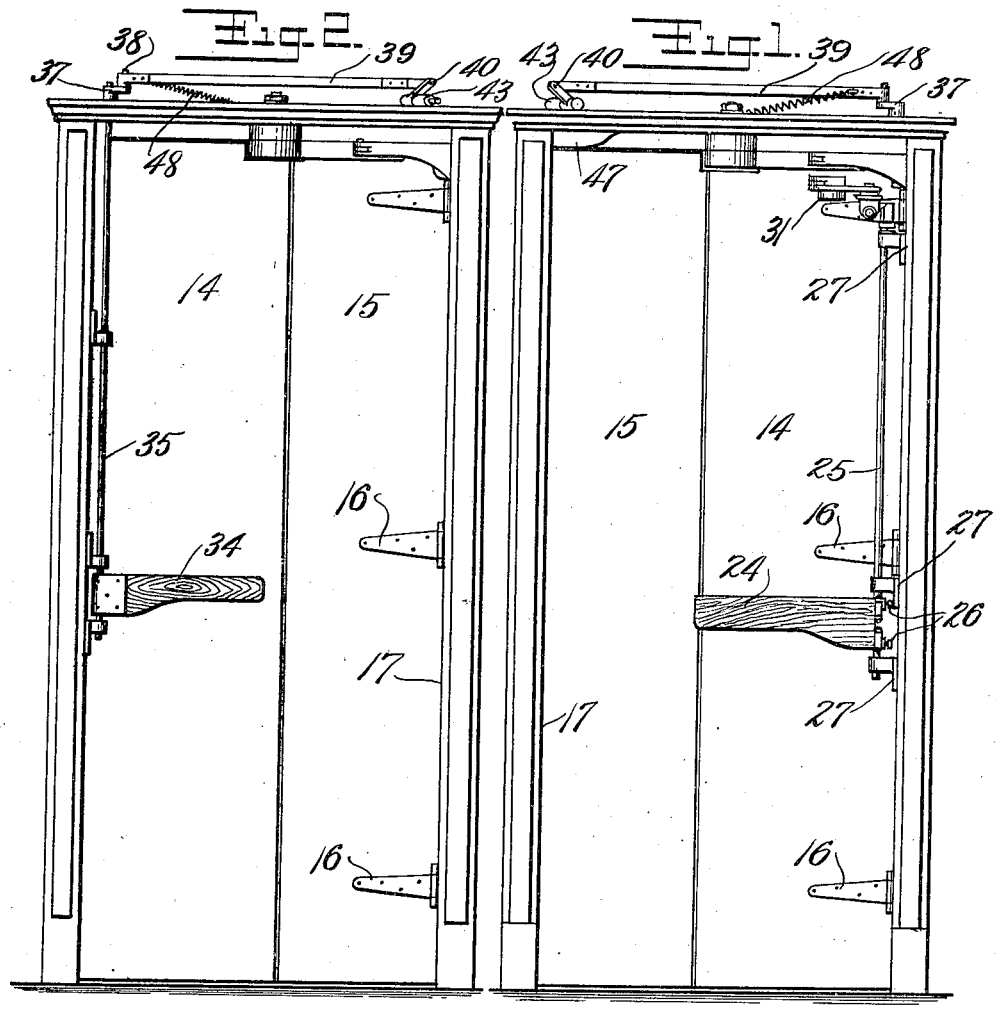

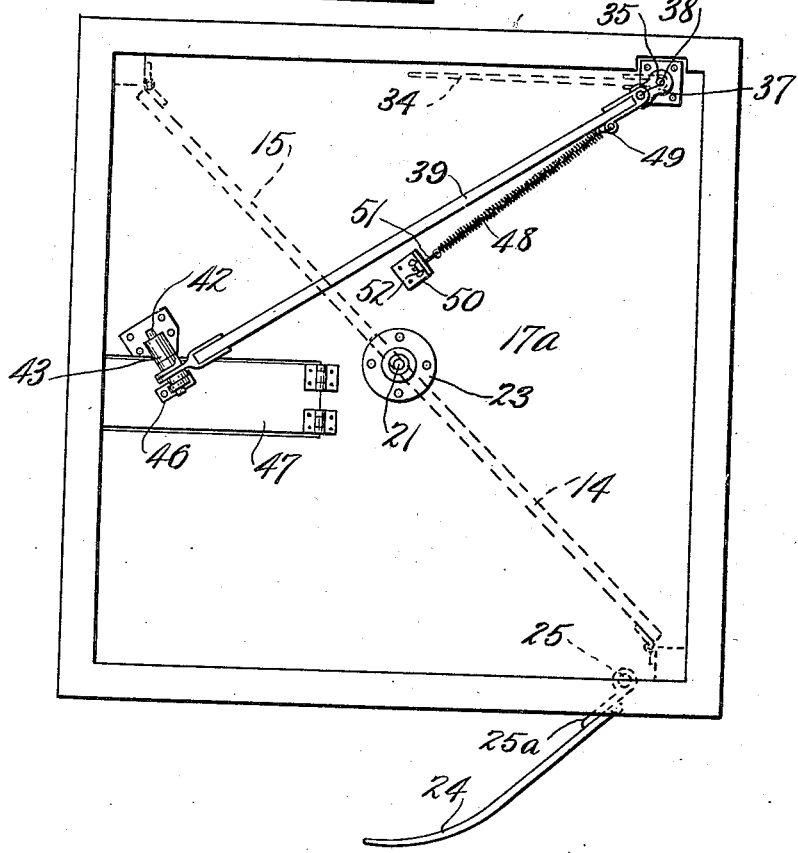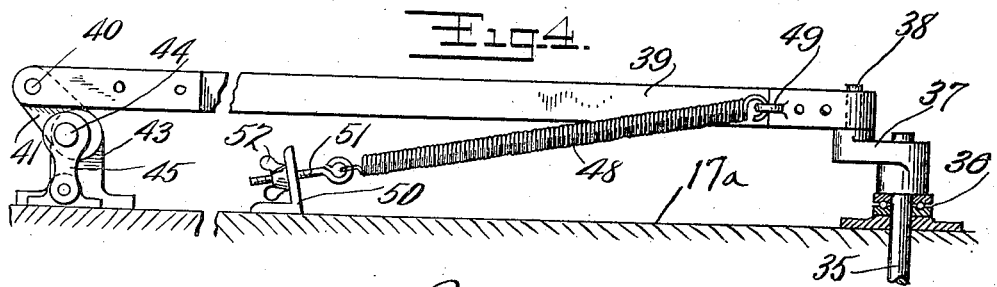

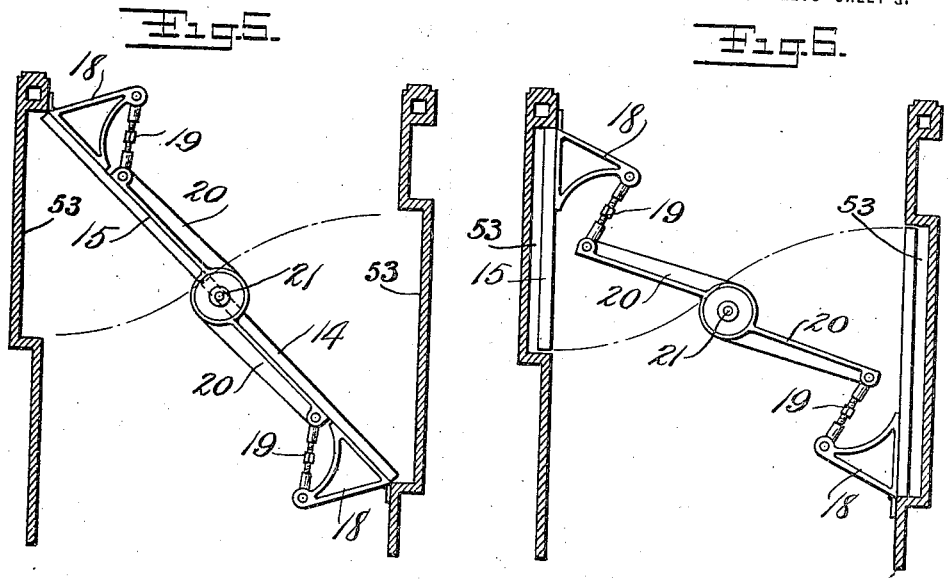
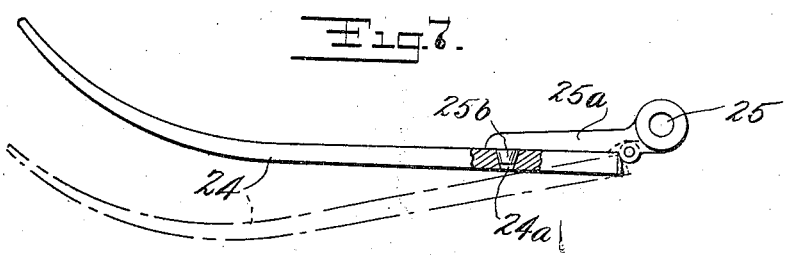
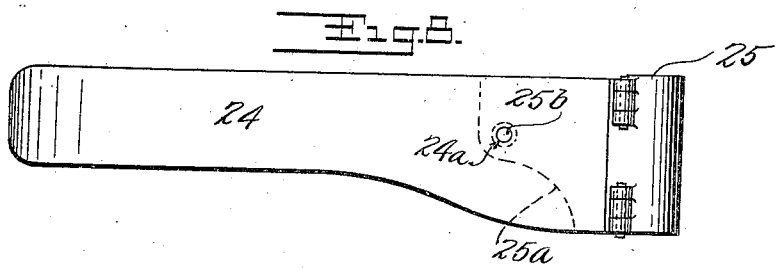

W. S. ELY.
WIND BALANCED DOOR.
APPLICATION FILED JULY 17, 1919.
1,438,477.
Patented Dec. 12, 1922.
4 SHEETS—SHEET 4.
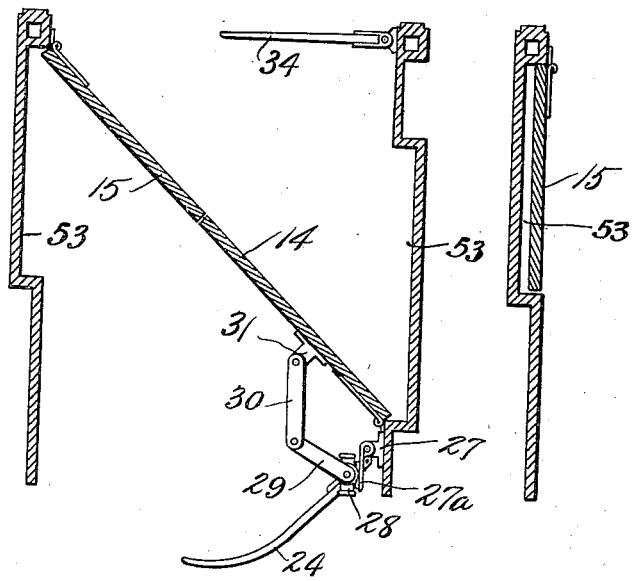
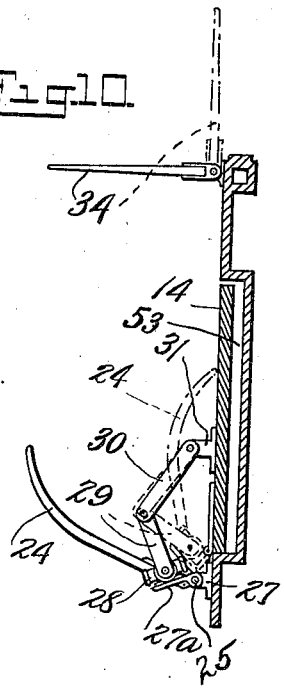
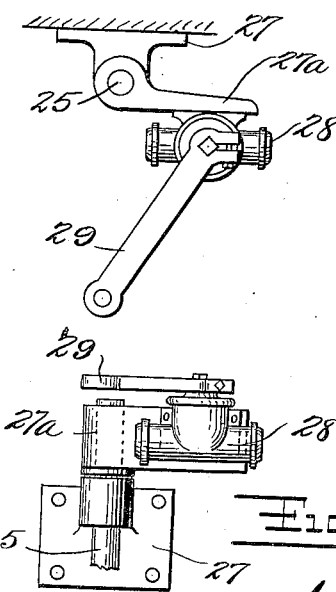
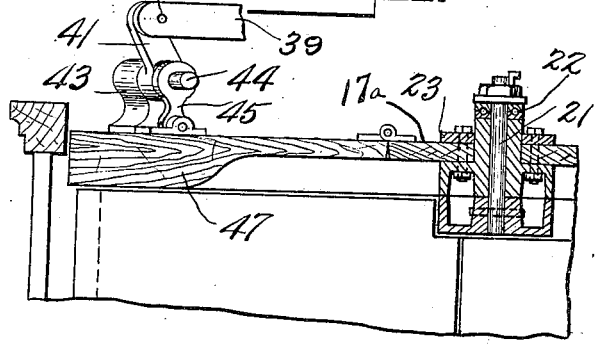
Walter S. Ely INVENTOR
BY
Clarence G. Campbell, his ATTORNEY.

Patented Dec. 12, 1922.

1,438,477

UNITED STATES PATENT OFFICE.

WALTER S. ELY, OF NEW YORK, N. Y., ASSIGNOR TO WALTER S. ELY, INC., OF NEW YORK, N. Y., A CORPORATION OF NEW YORK.

WIND-BALANCED DOOR.

Application filed July 17, 1919. Serial No. 311,482.

*To all whom it may concern:*

Be it known that I, WALTER S. ELY, a citizen of the United States, residing at 174 West 126th Street, city of New York, in the county of New York and State of New York, have invented certain new and useful Improvements in Wind-Balanced Doors, of which the following is a specification.

This invention relates to improvements in wind balanced doors, and more particularly to a type of balanced door which is adapted to be used by people whose hands are occupied in carrying something while passing through the door.

My invention consists in the combination of a wind balanced door with automatic opening, closing and controlling means.

There are many places where a door which can be easily opened without the use of the hands of the person passing through is required for satisfactory service, but all devices which have been heretofore furnished for this purpose have failed to meet the requirements because they required too much power to overcome the air pressure. This difficulty has been met successfully by my door, which furnishes means for easily opening, closing and controlling a wind balanced door.

Referring to the drawings Fig. 1 is a side elevation of my door from the entering side, and shows the closing control overhead. Fig. 2 is a side elevation of my door the same as Fig. 1, but looking at the door from the opposite side. Fig. 3 is a top plan view of my door. Fig. 4 is a side elevation of the closing control, which for convenience is shown as broken. Fig. 5 is a top plan view of the balance beam, spindle and connections which control the balanced feature of the door which is shown in its closed position. Fig. 6 is the same as Fig. 5, but shows the door in the wide open position. Fig. 7 is a plan view of the pusher, and partly broken away to show the details of construction. Fig. 8 is a side elevation in detail of the pusher. Fig. 9 is a top plan view of the pusher and its connections showing the door in the closed position. Fig. 10 is the same as Fig. 9, but shows the door in the open position. Fig. 11 is a vertical sectional view of the spindle and shows the adjacent parts of the door, some parts of which are broken away for convenience. Fig. 12 is a top plan view of the detail of the door check used in conjunction with the pusher and showing the connections therewith. Fig. 13 is a side elevation of the device shown in Fig. 12.

In the drawings 14 and 15 are wings of my door, which are mounted diagonally in the doorway by means of hinges 16 in the usual manner to the side wall 17 of a doorway, so as to swing freely in either direction. These wings are connected on their opposite sides by means of brackets 18 and links 19 to a balance beam 20, which is mounted so as to turn freely on the spindle 21, which is of usual construction and is mounted on ball bearings 22 by means of a flange 23, which is rigidly secured to ceiling $17^a$ of the doorway.

A pusher arm 24 is rigidly secured to a shaft 25 on one side of wing 14 by means of a double acting hinge $25^a$ and adjustable set screws 26. The hinge $25^a$ also has a knob $25^b$ to register in a hole $24^a$ of the arm 24 and prevent it from sagging. The shaft 25 is mounted loosely in brackets 27 which are rigidly secured to the frame 17 of the doorway. To the upper end of the shaft 25 is rigidly secured an arm $27^a$ to which is rigidly secured a door check 28 of usual construction, which is secured to the wing 14 at its other end by means of the links 29 and 30 and bracket 31, which is rigidly secured to the wing 14.

At substantially the same height from the floor, as the arm 24 on the opposite side of wing 14 is also rigidly mounted an arm 34 to a shaft 35, and to the upper end of this shaft, which is mounted on ball bearings 36, is a bell crank lever 37 which is rigidly secured thereto, and at its other end is a pin 38 integral therewith over which one end of a lever 39 is adapted to be mounted. The other end of the lever 39 is loosely secured by a pin 40 to a rocker 41. The lower end of the rocker 41 is loosely mounted on a shaft 42, which in turn is mounted at one end so that it will rotate freely in the bracket 43 which is rigidly secured to the ceiling $17^a$. The other end of this shaft is an eccentric 44, on which is mounted a link 45 so as to rotate freely, and to the lower end of link 45 is loosely secured bracket 46, which at its base is rigidly secured to a retaining member 47. A spring 48 is secured by means of an eyelet 49 to the lever 39 and is rigidly secured at its other end to the ceiling $17^a$ by means of a bracket 50, a screw 51 and a wing nut 52, by which the tension of the spring may be adjusted.

In the side walls 17 of the doorway are arranged cushioning pockets 53 which are adapted to receive the wings 14 and 15 in such a close fit that an air pocket will be formed therein and act as a cushion to prevent the slamming of the doors against the side walls 17.

The operation of my device is as follows:

If for example, the door is used in a hotel between the dining room and pantry a waiter approaching the door with a tray full of dishes will come in contact with the pusher arm 24 at about his waistline, and as he moves forward the arm 24 will move with him and the shaft 25 will turn therewith so that the wing 14 will be opened as the turning of the shaft 25 will press on the wing 14 through the check 28.

This is shown in Figures 9 and 10 passing from the closed position in Figure 9 to the wide open position in Figure 10. The wing 15 is connected with wing 14 as already described by the brackets 18, links 19 and the balance beam 20, which turns on the spindle 21 and so 14 and 15 travel together from the closed position shown in Figure 5 to the wide open position shown in Figure 6. As the person passing through leaves the pusher arm 24 in the wide open position, shown in dotted outline in Figure 10, the retaining member 47 is frictionally engaged with the wing 15 as it opens to the wide open position through the balance beam 20 synchronously with the opening of the wing 14. As the person passing through passes on from this position he will come in contact with the arm 34 also at about his waistline, and as he continues onward will press the arm 34 to the position shown in the dotted outline in Figure 10. This turning of the arm 34 also turns the shaft 35, which in turn throws the bell crank lever 37 around to a position to one side of its normal position which draws the lever 39 so that the rocker 41 is raised and thereby rotates the eccentric 44 so as to raise the retaining member 47 to which it is attached through the link 45. The wing 15 is thereby released from its full open position as held by member 47 and then both wings 14 and 15, which travel together through the control of the balance beam 20, are permitted to close to their normally closed position as shown in Fig. 9. The check 28 prevents the arm 24 from returning to its normal position too rapidly. If the person passing through changes his mind and wishes to go back after having passed the arm 24 then this is made possible by the double acting hinge 25ª, on which the arm 24 is mounted which permits such reverse action of the arm 24 as indicated in Figure 7. The wings 14 and 15 are prevented from slamming on being opened quickly by the air pockets 53. The spring 48 tends to return the arm 39 and the retaining member 47 to normal position in readiness for the next operation when the arm 34 is released.

The wings are mounted in a diagonal position in the doorway in order to reduce the required angle of opening by substantially 90 degrees in opening the doors to the full open position. It will also be noted that wing 14 is made materially wider than wing 15, which is a marked advantage in doors used between the dining room and pantry in hotels or in other similar locations where it will be found advantageous to have another door set so as to operate in the opposite direction for those coming out of the pantry into the dining room. It is also to be noted that the pusher arm 24 is mounted on the shaft 25 by means of a thumb screw 26 in such a manner that it may be adjusted to a higher or lower position on the shaft 25 as may be required for actual use. The principal advantage in having wing 14 wider than 15 lies in the fact that a more perfect wind balance is obtained thereby because the wind is spilled from 14 as it is slightly opened, whereas 15 has an increasing pressure of wind to overcome as it is forced back. This is especially true in hotel dining rooms where the artificial draft is always from the dining room into the pantry.

I claim:—

1. In a wind balanced door the combination of two wings, opening means consisting of a pusher arm connected to one wing through a shaft and door check, means for holding the door open, and closing means.

2. In a wind balanced door the combination of a pair of wings mounted diagonally in the doorway, a pusher arm connected to one wing by a shaft and door check, a balance beam suspended on a spindle connecting both wings overhead on opposite sides of the door, a retaining member normally in retaining position, a second arm on the other side of the same wing, which arm is connected by a shaft and lever to the retaining member so as to raise the same, a spring fastened to said lever so as to return the lever and connections to normal position, and cushioning pockets adapted to receive each of the two wings.

3. In a wind balanced door the combination of a pair of wings mounted diagonally in the doorway one of which is wider than the other, a pusher arm connected to one of the wings by a shaft and door check, a balance beam suspended on a spindle connecting both wings overhead on opposite sides of the door, a retaining member normally in retaining position, a second arm on the other side of the same wing, which arm is connected by a shaft and lever to the retaining member so as to raise the same, a spring fastened to said lever so as to return the lever and connections to normal position, and cushioning pockets adapted to receive each of the two wings.

4. In a wind balanced door the combination of a pair of wings, a pusher arm connected to one wing by a shaft and door check, a balance beam suspended on a spindle connecting both wings overhead on opposite sides of the door, a retaining member normally in retaining position, a second arm on the other side of the same wing, which arm is connected by a shaft and lever to the retaining member so as to raise the same, a spring fastened to said lever so as to return the lever and connections to normal position, and cushioning pockets adapted to receive each of the two wings.

5. In a wind balanced door the combination of a pair of wings mounted diagonally in the doorway, one of which is broader than the other, and a balance beam suspended on a spindle connecting both wings at opposite sides of the door by means of brackets and links.

6. In a wind balanced door the combination of a pair of wings and a balance beam suspended on a spindle connecting both wings at opposite sides of the door, and a pusher arm connected to one wing by means of a shaft and door check.

7. In a wind balanced door the combination of a pair of wings mounted diagonally in the doorway one of which is wider than the other and a balance beam suspended on a spindle connecting both wings at opposite sides of the door, and a pusher arm connected to one wing by means of a shaft and door check.

8. In a wind balanced door the combination of a pair of wings, one of which is broader than the other, and a balance beam suspended on a spindle connecting both wings at opposite sides of the door, and a pusher arm connected to one of the wings by means of a shaft and door check.

9. In a wind balanced door the combination of a pair of wings mounted diagonally in the doorway, one of which is broader than the other, and a balance beam suspended on a spindle connecting both wings at opposite sides of the door, and a pusher arm connected to one of the wings by means of a shaft and door check.

10. In a wind balanced door the combination of a pair of wings and a balance beam suspended on a spindle connecting both wings at opposite sides of the door, and a pusher arm connected to one wing by means of a shaft and door check and a second pusher arm connected by a shaft and lever to a retaining member which operates on the other wing.

11. In a wind balanced door the combination of a pair of wings mounted diagonally in the doorway and a balance beam suspended on a spindle connecting both wings at opposite sides of the door, and a pusher arm connected to one wing by means of a shaft and door check and a second pusher arm connected by a shaft and lever to a retaining member which operates on the other wing.

12. In a wind balanced door the combination of a pair of wings, one of which is broader than the other, and a balance beam suspended on a spindle connecting both wings at opposite sides of the door, and a pusher arm connected to the broader wing by means of a shaft and door check and a second pusher arm connected by a shaft and lever to a retaining member which operates on the other wing.

13. In a wind balanced door the combination of a pair of wings mounted diagonally in the doorway, one of which is broader than the other, and a balance beam suspended on a spindle connecting both wings at opposite sides of the door, and a pusher arm connected to the broader wing by means of a shaft and door check and a second pusher arm connected by a shaft and lever to a retaining member which operates on the other wing.

14. In a wind-balanced door the combination of opening means, consisting of a pusher arm connected to one wing by means of a shaft to which it is secured by double acting hinges, means for holding the door open and closing means.

15. In a wind-balanced door having a balance beam suspended on a spindle connected to the opposite sides of the door, the combination of opening means consisting of a pusher arm connected to one wing by means of a shaft to which it is secured by double acting hinges, means for holding the door open and closing means.

In testimony whereof I affix my signature.

WALTER S. ELY.